United States Patent [19]

Mihelich

[11] 3,959,714

[45] May 25, 1976

[54] TRANSIENT TURN-ON PROTECTION CIRCUIT FOR POWER SUPPLIES

[75] Inventor: Frederick A. Mihelich, Shoreview, Minn.

[73] Assignee: Sperry Rand Corporation, New York, N.Y.

[22] Filed: Sept. 24, 1973

[21] Appl. No.: 399,907

[52] U.S. Cl. .............................. 323/17; 323/22 T; 323/DIG. 1
[51] Int. Cl.² .......................................... G05F 1/56
[58] Field of Search ................. 321/2, 455; 323/17, 323/22 T, DIG. 1

[56] References Cited
UNITED STATES PATENTS

| | | | |
|---|---|---|---|
| 3,733,519 | 5/1973 | Griffey | 323/DIG. 1 |
| 3,733,540 | 5/1973 | Hawkins | 323/DIG. 1 |

FOREIGN PATENTS OR APPLICATIONS

| | | | |
|---|---|---|---|
| 1,181,350 | 2/1970 | United Kingdom | 323/DIG. 1 |

Primary Examiner—A. D. Pellinen
Attorney, Agent, or Firm—Thomas J. Nikolai; Kenneth T. Grace; Marshall M. Truex

[57] ABSTRACT

A protection circuit for a transistor switching regulator type power supply which prevents damage to the regulating transistor upon initial application of power to the system. The normal feedback control signal pulses used to control the "on-time" of the regulating transistor are combined with second control signal pulses whose pulse width increases as a function of time during a predetermined interval such that the regulating transistor will initially conduct for an extremely short period of time, but for longer and longer periods as time progresses until the output voltage from the regulator circuit is within the regulation band provided by the normal feedback control circuit.

4 Claims, 8 Drawing Figures

TRANSIENT TURN-ON PROTECTION CIRCUIT FOR POWER SUPPLIES

BACKGROUND OF THE INVENTION

Switching regulator type power supplies are well known in the art. In such arrangements, a power transistor is connected in series between an unregulated DC source and a load. The voltage developed across the load is sensed and compared to a predetermined reference and the resulting control signal from the comparator is used to control the switching of the transistor in such a fashion that the output voltage appearing across the load is maintained relatively constant within the regulation band of the system.

It has been found that such prior art voltage regulator circuits suffer from a common defect. Specifically, until such time that the feedback voltage comes within the designed regulation band following initial start-up, the series switching transistor is maintained in a condition allowing a heavy current to flow therethrough from the source to the load. The associated power, if allowed for an excessive time interval, will exceed the dissipation rating of the series switching transistor, resulting in permanent damage thereto.

To obviate this problem, the present invention provides a means for controlling the "on-time" of the series switching transistor during the interval following the turning on of the power supply up until the sampled feedback voltage lies within the regulation band of the power supply. To achieve this end, there is provided an additional circuit, which, upon energization of the power supply, creates a series of pulses of successively increasing duration which are AND'ed together with the output from the conventional comparator means of the regulator, such that the series switching transistor is periodically turned on, but only for short periods of time so that the power dissipation rating of the switching transistor is not exceeded. However, when the normal sensed feedback voltage falls within the regulation band of the system, the output from the conventional comparator takes over and thereafter controls the turning on and off of the series switching transistor.

It is accordingly an object of the present invention to provide an improved switching transistor type voltage regulator for a power supply.

Another object of the invention is to provide an auxiliary control circuit for a switching transistor type power supply regulator which prevents damage to the switching transistor for the transient interval following the turning on of the system.

Still another object of the invention is to provide an auxiliary control circuit for a switching transistor type voltage regulator which allows the voltage developed across the load of the supply to be built up over a period of short increments until the output voltage lies within a predetermined regulation band.

These and other objects of the invention will become apparent from a reading of the following detailed description of the preferred embodiment as depicted in the accompanying drawings in which.

FIG. 1 — CONSTRUCTION

Figure 1:
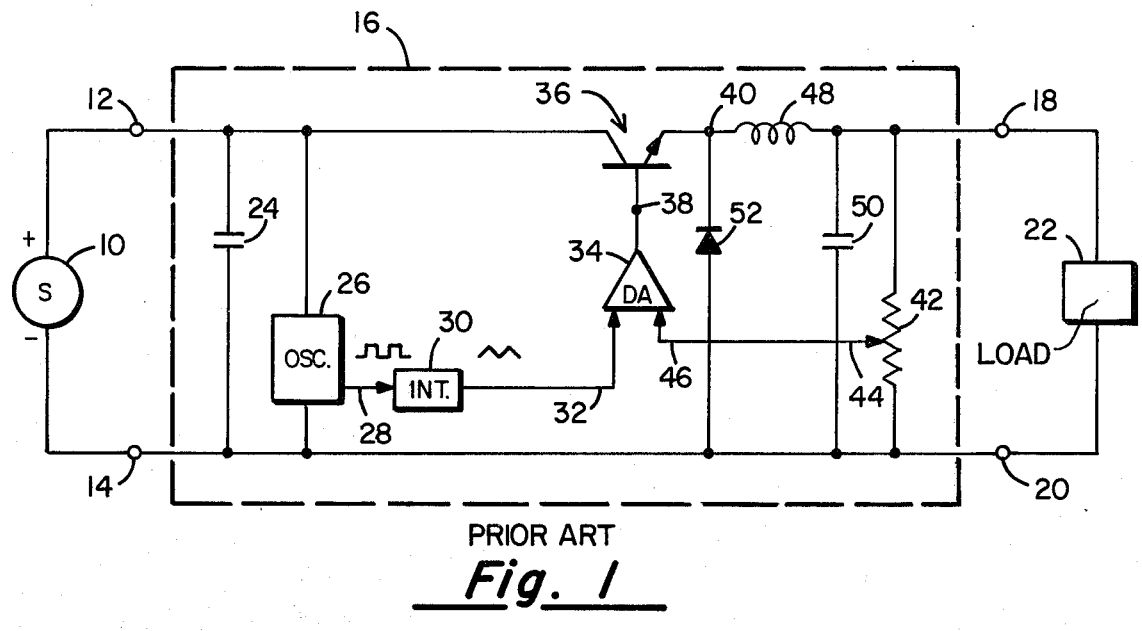
FIG. 1 is a schematic diagram of a conventional prior art switching transistor type voltage regulator.

Referring first to FIG. 1, there is shown a source 10 of unregulated DC voltage which is connected at terminals 12 and 14 to a solid-state switching transistor type voltage regulator, shown enclosed by the broken line box 16. The function of the regulator 16 is to provide at the output terminals 18 and 20 a regulated direct current voltage which remains constant (within limits) independent of variations in the supply 10 or in the load 22 connected across the output terminals 18 and 20. The regulator 16 includes a capacitor 24 connected directly across the input terminals 12 and 14. Also connected between terminals 12 and 14 is a free-running square wave oscillator 26 which produces square wave pulses on its output line 28 at a rate of around 20,000 hertz. It is to be understood that this frequency is not critical and is suggested only by way of an example. The output line 28 from the oscillator is connected through an integrating circuit 30 to a first input 32 of a differential amplifier 34. The integrator 30 operates upon the square wave pulse produced by the oscillator 26 to yield a saw-tooth waveform. It is this saw-tooth waveform that constitutes the reference voltage for the regulator and defines the regulation band.

Connected in series between the source 10 and the load 22 is an NPN transistor 36. Of course, a PNP transistor could just as well be used, provided proper polarity conventions are observed. The output from the differential amplifier 34 is connected to the base or control electrode of transistor 36 at a junction point 38. The collector electrode of the transistor is connected to the input terminal 12 and the emitter electrode is connected to a junction 40.

Connected directly between the output terminals 18 and 20 and in parallel with the load 22 is a voltage divider 42 having an adjustable tap 44. This tap is connected to a second input terminal 46 of the differential amplifier 34. A filter choke 48 is connected in series between the junction 40 and the output terminal 18. A filter capacitor 50 is also connected between the output terminals 18 and 20 and with the choke 48 forms an L-section filter network. Finally, a so-called "free-wheeling" diode 52 has its cathode connected to the junction point 40 and its anode connected to the line joining the input terminal 14 to the output terminal 20.

Now that the construction of the prior art switching transistor type voltage regulator has been described, consideration will be given to its mode of operation.

FIG. 1 — OPERATION

As in all switching transistor type voltage regulators, the load voltage is sensed and a signal proportional to the output voltage is fed back to a comparator where it is compared with a predetermined reference and any resulting difference signal is used to control the series impedance presented by the switching transistor so that the difference signal will be reduced to zero. The voltage divider 42 is the means for sensing the output voltage level. A portion of this output voltage is fed back via the adjustable tap 44 to the input terminal 46 of the differential amplifier 34. As mentioned above, the oscillator 26 and its associated integrating circuit 30 is the means for applying the predetermined reference signal to the differential amplifier 34. More specifically, the output from the integrator 30 appearing on input terminal 32 is adjusted to provide a saw-tooth modulated reference signal which, for example, might be +1.8 volts when a Type LM 305 differential amplifier integrated circuit chip manufactured by the National Semiconductor Corporation is used as the comparator element 34. Thus, when the feedback signal applied to the input terminal 46 is less than the modulated +1.8 volt reference signal, the differential amplifier 34 will produce a high output signal at junction 38 causing the transistor 36 to conduct and a current will flow from the source 10 through the collector-to-emitter path of the switching transistor 36 and through the filter network, including the choke 48 and the capacitor 50, to increase the voltage appearing across the load 22. This increase in voltage will be sensed by the voltage divider potentiometer 42 and again fed back and compared with the reference voltage in the differential amplifier 34.

The problem with the prior art circuit of FIG. 1 is that when the power to the system is first turned on, the feedback voltage applied to the differential amplifier input terminal 46 will be less than the reference voltage applied to the input terminal 32 for an extended period, depending upon the transient response of the network. During this transient period, the transistor 36 will be held in a conducting state so that the current flow through it during this period may cause the power dissipation rating to be exceeded. As such, the transistor 36 may be burned out or subjected to such a stress that it will fail after only a very limited life. The circuit modification of the present invention is intended to obviate this problem.

FIG. 2 — CONSTRUCTION

Figure 2:
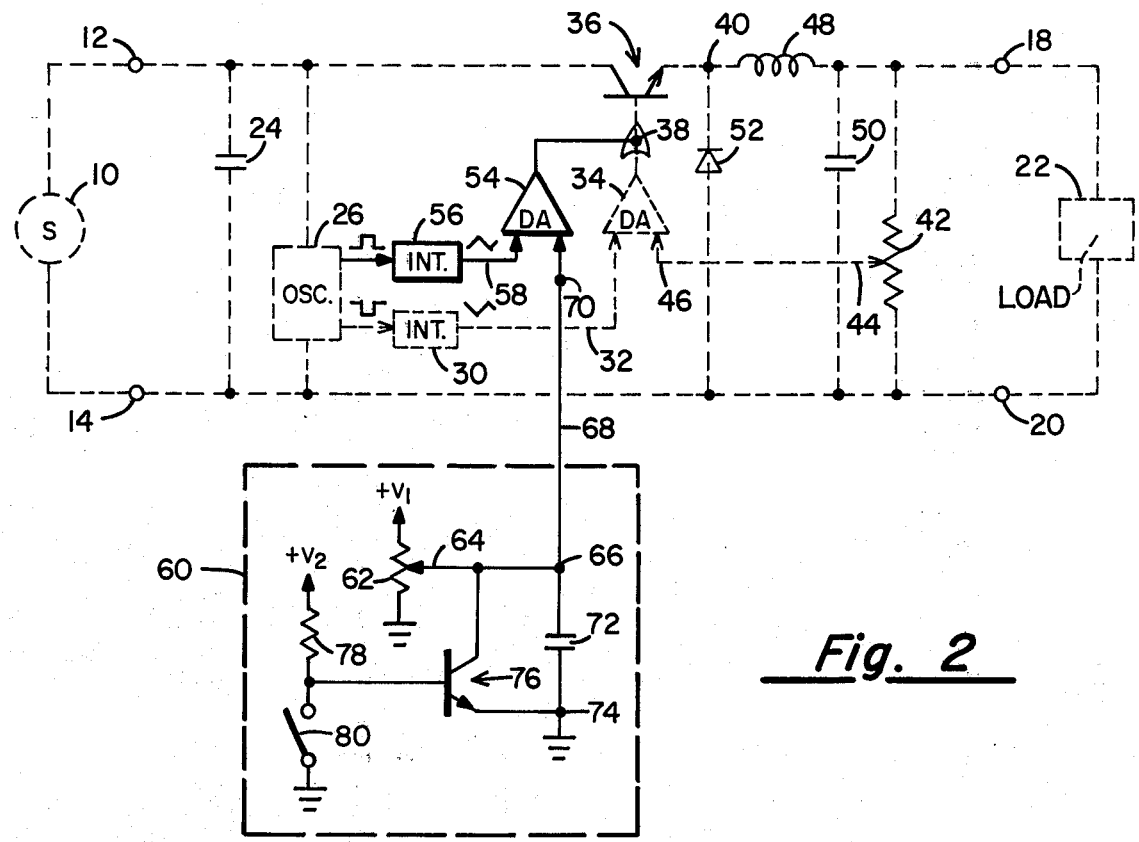
FIG. 2 shows the manner in which the present invention is connected into the circuit of FIG. 1.

Referring now to FIG. 2, there is shown in a broken line representation the conventional switching transistor type voltage regulator of FIG. 1. The modification comprising the present invention is depicted in solid line form. The same numerals used to identify the components in FIG. 1 are also used in FIG. 2.

The additional circuits used to control the conduction of the switching transistor 36 during the initial turn-on period to avoid damage to the switching transistor include a second differential amplifier 54 which may be of the same type as the differential amplifier 34. A second integrating circuit 56 is coupled to the complementary output terminal of the square wave oscillator 26 and acts in the same fashion as the integrator 30 to convert the square wave pulses to a saw-tooth waveform before they are applied to the reference input terminal 58 of the differential amplifier 54. The other input to the amplifier 54 comes from a R-C time base generator shown enclosed by dashed line box 60. Specifically, a closely regulated voltage source +V$_1$ such as, for example, a 7 volt DC supply, is connected across a resistive voltage divider 62 having an adjustable tap 64. The tap 64 is connected to a junction 66 which, in turn, is connected by conductor 68 to the second input terminal 70 of the differential amplifier 54. A timing capacitor 72 is connected between junction 66 and grounded terminal 74. Connected in parallel with the timing capacitor 72 is the collector-to-emitter path of an NPN transistor 76. The base or control electrode of transistor 76 is connected through a resistor 78 to a relatively positive voltage +V$_2$ which, for example, may be +30 volts. The base electrode is also adapted to be connected to ground by way of a power-on switch 80. In FIG. 2, switch 80 is represented as a mechanical single-pole, single-throw switch, but in practice may comprise an additional transistor stage.

When the switch 80 is open, the voltage appearing on the base of transistor 76 will be positive and transistor 76 will be conducting so that the terminal 66 is at ground potential. When the switch 80 is closed, the transistor 76 will be turned off and a current will begin to flow from the source +V$_1$ through the potentiometer 62 and the capacitor 72 to ground. As the capacitor 72 begins to charge, the voltage appearing at the junction 66 begins to rise exponentially to the reference voltage (e.g., +1.8 volts) determined by the setting of the tap 64. The rate of increase will be determined by the R$_{62}$ C$_{72}$ time constant.

FIG. 2 — OPERATION

Figure 3:
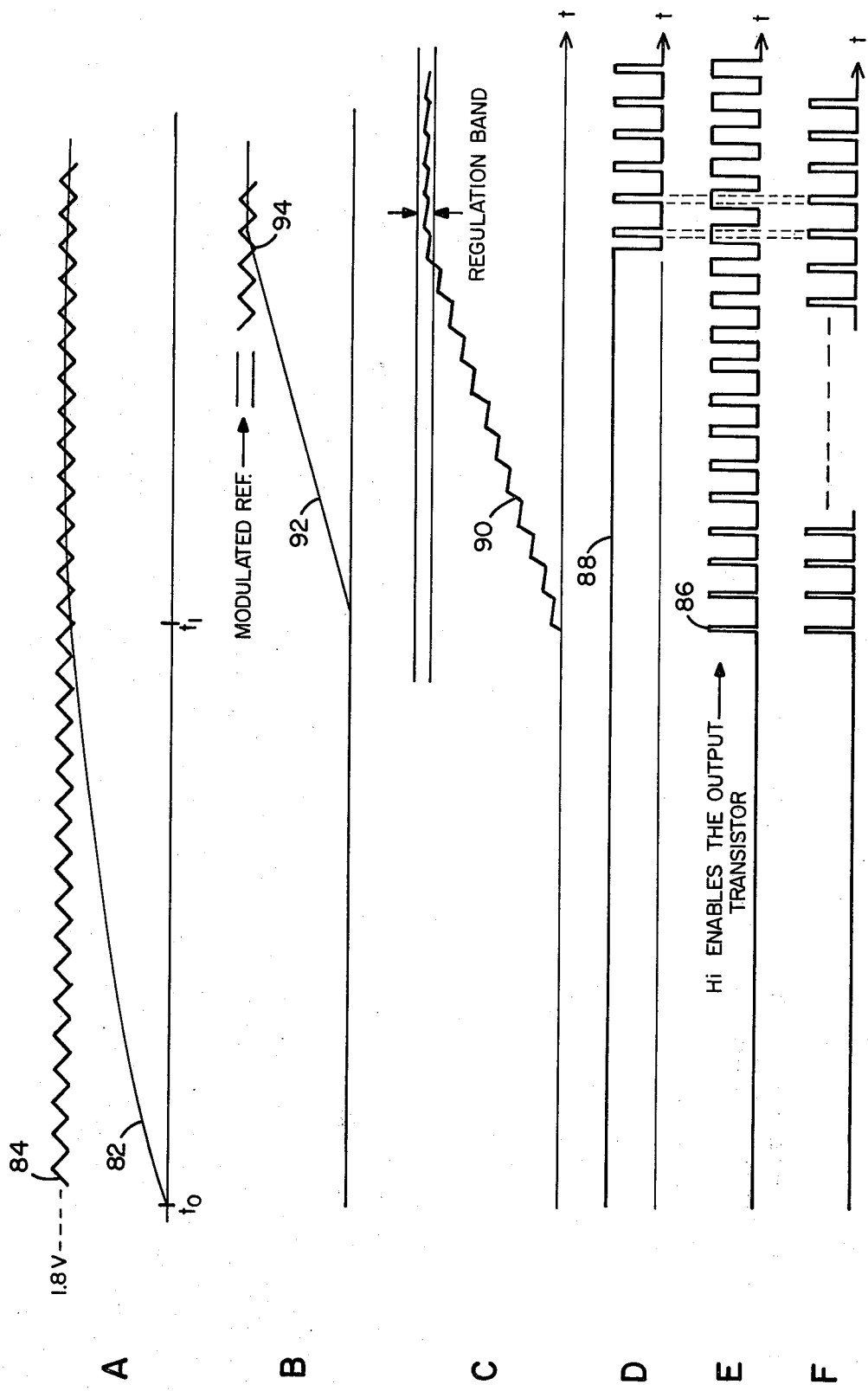
FIGS. 3A through 3F are illustrative waveforms useful in explaining the operation of the circuit of FIG. 2.

Referring now to FIG. 3, an explanation will be given as to how the circuitry of FIG. 2 operates to protect the switching transistor 36 from burn-out during the initial turn-on transient intervals. Let it be assumed that switch 80 is closed at time t$_0$ (FIG. 3A). At this time, the bias applied to the NPN transistor 76 will be removed and transistor 76 will assume its high impedance state and will no longer short out the capacitor 72. Current will begin to flow from the +V$_1$ source through the voltage divider 62 and the capacitor 72 to ground. The voltage appearing across the capacitor 72 will begin to rise along an exponential curve and will asymptotically approach a preset reference established by the tap 64 on the voltage divider 62. This tap is set so that when a steady state is reached, the voltage at junction 66 will be approximately +1.8 volts. This voltage waveform is represented by curve 82 in FIG. 3A. This voltage is applied by way of conductor 68 to the input terminal 70 of differential amplifier 54. At the same time, the oscillator 26 and integrator 56 are operative to apply a saw-tooth modulated reference voltage to the other input terminal 58 of the differential amplifier 54. This modulated reference waveform is identified by numeral 84 in FIG. 3A. At time $t_1$ the rising voltage 82 exceeds the modulated reference waveform 84 causing the differential amplifier 54 to produce an output pulse 86 (FIG. 3E) having a width determined by the length of time during which the voltage 82 exceeds the reference voltage 84.

As was mentioned when explaining the operation of the circuit of FIG. 1, the differential amplifier 34 produces a relatively high binary signal at its output whenever the feedback voltage picked off at the tap 44 is less than the reference voltage applied to its input term;inal 32. This condition is represented by the waveform 88 (FIG. 3D). Were it not for the circuit of the present invention, the high output at terminal 38 would turn on the series switching transistor 36 immediately upon energization of the system and would hold transistor 36 fully conducting for an extended period until it either burned out or until the feedback voltage applied to input terminal 46 exceeded the reference voltage.

Because of the manner in which the output from differential amplifier 54 is connected to the junction 38, a relatively low binary signal will be applied to the control electrode of the transistor 36 whenever either the output from differential amplifier 34 or the output from differential amplifier 54 is low. Stated otherwise, a pulse for turning on the series regulating transistor 36 will be obtained only when the outputs from both differential amplifiers 34 and 54 are simultaneously high. Thus, it can be seen by reference to FIG. 3F that the transistor 36 will be turned on only during the time intervals that the pulses in FIGS. 3D and 3E are simultaneously high.

The waveform of FIG. 3C illustrates the power supply output voltage measured between the terminals 18 and 20. At the time $t_1$ when the first turn-on pulse is applied to the transistor 36, current will begin to flow to the load circuit and to the L-section filter comprised of choke 48 and capacitor 50. Because of the extremely short pulse duration of the initial pulses produced by the differential amplifier 54 and the spacing between them, the power dissipation rating of the transistor 36 is not exceeded. As the charge of capacitor 72 continues to build up, each successive output pulse from the differential amplifier 54 will have a longer pulse duration as illustrated in the waveform of FIG. 3E. Hence, on each successive cycle of the saw-tooth reference wave 84 additional current will be supplied through the switching transistor 36 to the output filter and load. Thus, the output voltage will increase in steps as depicted by the waveform 90 in FIG. 3C.

As soon as an output voltage is developed, a signal proportional thereto will be developed across the voltage divider 42 and will be fed back to the input terminal 46 of the differential amplifier 34. This feedback signal is depicted by waveform 92 in FIG. 3B. As this feedback voltage increases, a point is reached where it exceeds the saw-tooth modulated reference voltage applied to the input terminal 32. This condition is depicted at point 94 in FIG. 3B. At this time, the output from differential amplifier 34 will go low indicating that the regulated output voltage lies within the regulation band of the system. Whenever the feedback voltage is less than the reference voltage, the differential amplifier 34 will produce a high signal to turn on the transistor 36, provided the output from the differential amplifier 54 is also high at this time. Because the voltage source $+V_1$ is closely regulated, when the steady state condition is reached the voltage representing the waveform 82 will be midway between the upper and lower excursions of the modulated waveform 84 and the resulting output pulses from the differential amplifier 54 will be of maximum width. This insures that the "on-time" of the switching transistor 36 will be controlled exclusively by the output from differential amplifier 34 once the regulator output voltage 90 lies within the regulation band of the system.

It is to be noted that the "turn-on" pulses for the regulating transistor 36 become wider and wider as controlled by the differential amplifier 54 until such time as the feedback signal to the input terminal 46 of differential amplifier 34 takes over and limits the conduction period of the switching transistor.

While there have been shown and described the fundamental novel features of the invention as applied to a preferred embodiment, it will be understood that various omissions, substitutions and changes in the form and details of the device illustrated and in its operation may be made by those skilled in the art without departing from the spirit of the invention. It is the intention therefore, to be limited only as indicated by the scope of the following claims.

What is claimed is:

1. In a switching transistor type voltage regulator circuit wherein a semiconductor switch is used to connect an unregulated voltage source to a load and wherein means are provided for comparing a feedback signal proportional to the output voltage to a preset reference and producing first control pulses for turning on the semiconductor switch whenever said feedback signal is less than said preset reference, the improvement comprising:
    a. means for producing second control pulses of successively increasing pulse duration a predetermined time following said initial energization of said regulator circuit; and
    b. means for logically combining said first control pulses and said second control pulses such that said semiconductor switch is turned on only when said first and second control pulses are of a predetermined binary significance.

2. Apparatus as in claim 1 wherein said first mentioned means comprises:
    a. a reference source of saw-tooth modulated voltage;
    b. a time base generating circuit for producing an exponentially increasing voltage asymptotically approaching said reference source; and
    c. differential amplifier means having an output terminal and first and second input terminals, said input terminals adapted to receive said saw-tooth modulated reference voltage and said exponentially increasing voltage thereon for producing an output only when said exponentially increasing voltage exceeds said saw-tooth modulated reference voltage.

3. Apparatus as in claim 2 wherein said time base generating circuit comprises:
    a. a source of regulated direct current voltage;
    b. a variable resistance voltage divider connected to said source of regulated direct current;
    c. a capacitor connected in parallel circuit with said voltage divider;
    d. switching means for normally preventing the buildup of voltage on said capacitor until such time that said regulator circuit is initially energized; and
    e. means connecting said capacitor to one of said input terminals of said differential amplifier means.

4. Apparatus as in claim 3 wherein said switching means comprises:
    a. a normally conducting transistor having its emitter and collector electrodes connected across said capacitor; and
    b. means for turning off said transistor upon the energization of said regulator circuit.

* * * * *